US008898605B2

(12) United States Patent
Ding et al.

(10) Patent No.: US 8,898,605 B2
(45) Date of Patent: Nov. 25, 2014

(54) ON-CHIP TUNABLE TRANSMISSION LINES, METHODS OF MANUFACTURE AND DESIGN STRUCTURES

(75) Inventors: Hanyi Ding, Colchester, VT (US); Guoan Wang, Burlington, VT (US); Wayne H. Woods, Jr., Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 12/911,327

(22) Filed: Oct. 25, 2010

(65) Prior Publication Data

US 2012/0102444 A1 Apr. 26, 2012

(51) Int. Cl.
*G06F 17/50* (2006.01)
*H01P 3/08* (2006.01)
*H01P 1/15* (2006.01)

(52) U.S. Cl.
CPC ... *H01P 3/08* (2013.01); *H01P 1/15* (2013.01)
USPC .......... 716/110

(58) Field of Classification Search
CPC ........... H01L 2224/48091; H01L 2924/10253; H01L 2924/00; H01L 2924/00014; H01L 2924/3011; H01L 2224/05553; H01L 2224/49171; H01L 23/49816; H01L 23/49838; H01L 23/50; H01L 23/5222; H01L 23/5225
USPC .......... 716/110
See application file for complete search history.

(56) References Cited

U.S. PATENT DOCUMENTS

| | | | | |
|---|---|---|---|---|
| 4,604,591 | A | 8/1986 | Vasile | |
| 6,320,480 | B1 * | 11/2001 | Kintis et al. | 333/156 |
| 6,959,062 | B1 | 10/2005 | Stubbs | |
| 7,352,325 | B1 | 4/2008 | Floyd et al. | |
| 7,368,311 | B2 | 5/2008 | Tilmans et al. | |
| 2002/0069374 | A1 | 6/2002 | Kopser et al. | |
| 2003/0065870 | A1 * | 4/2003 | Kawaguchi | 710/315 |
| 2004/0153684 | A1 | 8/2004 | Liu et al. | |
| 2005/0062137 | A1 | 3/2005 | Singh et al. | |
| 2005/0262459 | A1 | 11/2005 | Schumann | |
| 2006/0164141 | A1 | 7/2006 | Self | |
| 2009/0189725 | A1 | 7/2009 | Ding et al. | |
| 2009/0315633 | A1 | 12/2009 | Ding et al. | |
| 2009/0315641 | A1 | 12/2009 | Ding et al. | |

OTHER PUBLICATIONS

Woods et al., "Novel on-chip variable delay transmission line with fixed characteristic impedance", Electronic Components and Technology Conference, pp. 1948-1952, May 26-29, 2009.*

Adabi et al., "Broadband Variable Passive Delay Elements Based on an Inductance Multiplication Technique", Radio Frequency Integrated Circuits Symposium, pp. 445-448, Jun. 2008, IEEE.*

Yu et al., "Tunable Nonlinear Transmission Lines with switched varactors", Circuits and Systems, 2009. ISCAS 2009. IEEE International Symposium on, May 24-27, 2009, pp. 2077-2080.*

(Continued)

*Primary Examiner* — Jack Chiang
*Assistant Examiner* — Brandon Bowers
(74) *Attorney, Agent, or Firm* — Anthony Canale; Roberts Mlotkowski Safran & Cole, P.C.

(57) ABSTRACT

An on-chip tunable transmission line (t-line), methods of manufacture and design structures are provided. The structure includes a tunable transmission line (t-line) with fixed characteristic impedance comprising functionally-differentiated switches used for inductance and capacitance, respectively.

18 Claims, 11 Drawing Sheets

(56) References Cited

OTHER PUBLICATIONS

P.A. Brennan, et al.; "Delay Line for Use with Integrated Circuits"; Apr. 1967; IBM TDB, Abstract.
E.P. Harris; "Superconducting Delay Line With Electronically Variable Delay"; Oct. 1972; IBM TDB, Abstract.
S.B. Kaplan; "Variable on Chip Delay Line with Josephson Devices"; Mar. 1983; IBM TDB, Abstract.
Woods et al., "Analysis and Measurement of Impedance", IEEE SiRF, Jan. 2010 (4 pages).

* cited by examiner

ON-CHIP TUNABLE TRANSMISSION LINES, METHODS OF MANUFACTURE AND DESIGN STRUCTURES

FIELD OF THE INVENTION

The invention relates to semiconductor structures, methods of manufacture and design structures and, more particularly, to on-chip tunable transmission lines (t-line), methods of manufacture and design structures.

BACKGROUND

Millimeter waver (mmW) CMOS transceivers have attracted heightened interest in recent years, particularly in the 60-GHz band. In fact, there is currently a high demand for mmW tunable transmission lines (t-lines) that have controllable delay but fixed characteristic impedance. These applications can be very effective for use in systems requiring high download rates of about 1.6 Gb/s within the 60-GHz band. Currently, there are many challenges to mmW in CMOS technology. For example, tunable t-lines that have fixed characteristic impedance are very sensitive to switch capacitance and therefore are difficult to make using FETs.

More specifically, conventional on-chip t-line structures generally have fixed impedance and fixed delay. Usually, delay and impedance cannot be arbitrarily chosen for a given transmission line. Instead, the delay and impedance are affected by the capacitance and inductance, which vary inversely to one another based upon the distance between the signal line and the ground return line(s). As such, while it is possible to change the delay of a transmission line, changing the delay comes at the cost of increasing signal loss, changing the characteristic impedance, and/or increasing the required area (e.g., footprint) of the transmission line device.

Changing the delay of a transmission line, however, is desirable for a number of applications. For example, delay lines are utilized in signal processing operations for adjusting the time of arrival of one signal relative to that of a second signal. The delay lines may be fabricated for digital circuitry or analog circuitry, and the delay may be fixed or variable.

However, systems that utilize delays (e.g., phased-array antenna systems) suffer from the above noted drawbacks. Accordingly, there exists a need in the art to overcome the deficiencies and limitations described hereinabove.

SUMMARY

In a first aspect of the invention, a structure comprises a tunable transmission line (t-line) with fixed characteristic impedance comprising functionally-differentiated switches used for inductance and capacitance, respectively.

In another aspect of the invention, a method of manufacturing a transmission line structure comprises forming a tunable transmission line (t-line) with fixed characteristic impedance comprising functionally-differentiated switches used for inductance and capacitance.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of the tunable t-line, which comprises the structures of the present invention. In still further embodiments, a method in a computer-aided design system is provided for generating a functional design model of the tunable t-line. The method comprises generating a functional representation of the structural elements of the tunable t-line.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

The invention relates to semiconductor structures, methods of manufacture and design structures and, more particularly, to on-chip tunable transmission lines, methods of manufacture and design structures. More specifically, the present invention is directed to a millimeter wave (mmW) on-chip tunable transmission line (t-line) with functionally differentiated inductance and capacitance switches. In embodiments, the mmW on-chip tunable t-line design eliminates the need to reduce off-state switch capacitances while making off-state switch capacitances an integral part of the circuit design. Additionally, the mmW tunable t-line of the present invention can be made using on-chip FETs using conventional CMOS processes, which considerably reduces manufacturing costs. For example, the designs of the present invention are DRC (design rule checking) clean and require no additional processing steps using conventional CMOS processing. Also, the designs of the present invention provide a solution to eliminate extreme sensitivity of on-chip switch capacitance of a mmW tunable t-line design with fixed characteristic impedance. Moreover, and advantageously, the design of the present invention is area neutral, e.g., the design does not consume any more silicon area relative to conventional t-lines.

Figure 1A:
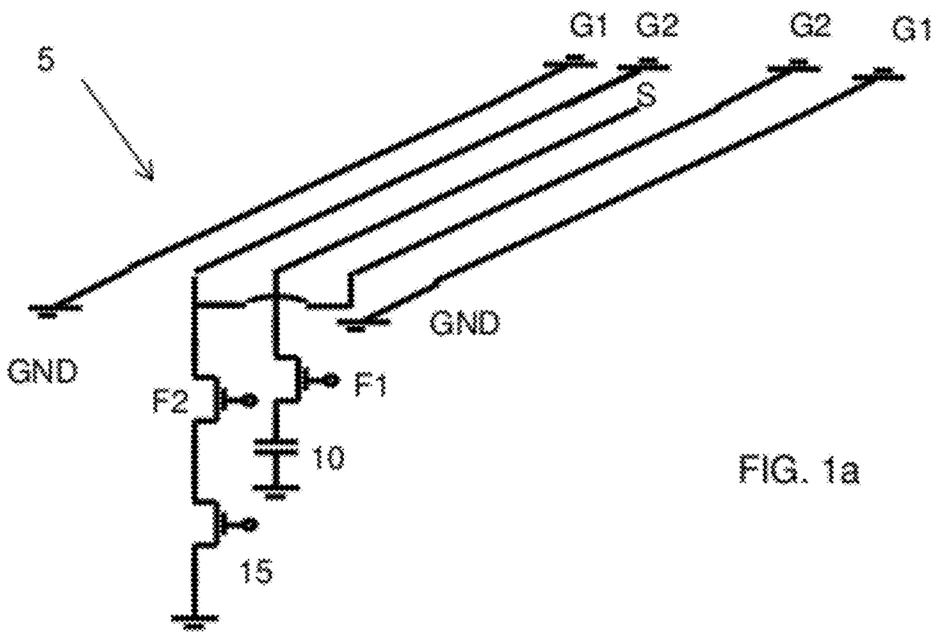
FIG. 1*a* shows an embodiment of a circuit in accordance with aspects of the present invention.

FIG. 1*a* shows an embodiment of a structure in accordance with aspects of the present invention. More specifically, FIG. 1*a* shows a representative tunable t-line circuit with functionally differentiated switches, generally represented at reference numeral 5. The structure 5 includes ground return lines G1 and inductor control lines G2. The ground return lines G1 are both connect to ground GND. The structure 5 further includes a signal line S, e.g., capacitance control line. In embodiments, a transistor F1 is connected in series with a capacitor 10 to the signal line S. Also, a transistor F2 is connected in series with another transistor 15 to the inductor control lines G2. In embodiments, the transistors, F1, F2 and 15 are FETs, formed using conventional CMOS processes.

In operation, the transistor F1 switches the line capacitance through the signal line S. The transistor F2, on the other hand, switches the line inductance through the inductor control lines G2. When the transistor F1 is on and the transistor F2 is off, the structure 5 is in the slow state. On the other hand, when the transistor F1 is off and the transistor F2 is on, the structure 5 is in the fast state. In this way, the present invention acts like a variable capacitance and a variable inductance, e.g., the circuit changes capacitance and inductance when the transistors F1, F2 are turned on and off. That is, as described below, the circuit of the present invention is capable of adjusting capacitance and inductance in unison to maintain a fixed impedance of the structure. Also, in embodiments, the transistor 15 can always remain off to act like a large capacitance, which may be the same size as transistor F2.

Figure 1B:
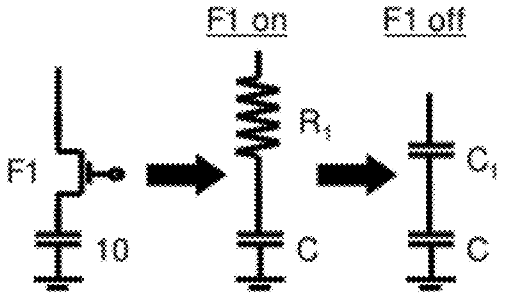
FIGS. 1*b* and 1*c* are representative circuits of FIG. 1*a* in an on state and off state.

FIG. 1*b* is a representative circuit of the transistor F1 in the on state and the off state. More specifically, in the on state of transistor F1, the circuit effectively becomes a resistor $R_1$ in series with the capacitor C (e.g., capacitor 10). In embodiments, $R_1$ can be quite high and still provide effective additional capacitance to the signal line S. For example, the resistance $R_1$ can be greater than 5Ω. Accordingly, the transistor F1 effectively becomes a resistor in the on state. In the off state of transistor F1, the circuit effective becomes two capacitors $C_1$ and C, in series. Accordingly, the transistor F1 effectively becomes a capacitor in the off state. The capacitor C, in either the on state or the off state, is representative of an additional signal line capacitance in the slow state. Also, $(C_1C)/(C_1+C)$ is representative of an additional signal line capacitance of a fast state.

Figure 1C:
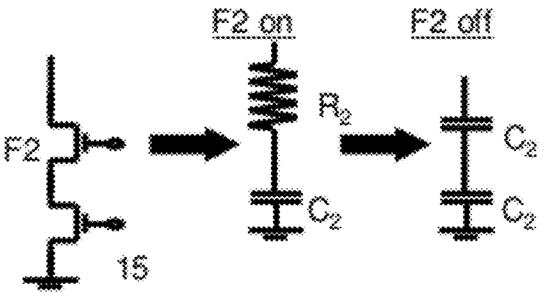

FIG. 1*c* is a representative circuit of the transistor F2 in the on state and the off state. In either of the on state or the off state, transistor 15 remains off and, hence, acts like a large capacitance. In the on state of transistor F2, the circuit effectively becomes a resistor $R_2$ in series with the capacitor $C_2$ (e.g., capacitor 10). In embodiments, $R_2$ can be low such as, for example, less than 5Ω, to reduce any losses in the return path. In the off state of transistor F2, the circuit effective becomes two capacitors $C_2$ and $C_2$, in series. The capacitor $C_2$ is equivalent to the resonant return current capacitance in the slow state. Also, ½ $C_2$ is representative of the resonant return current capacitance in the fast state.

In the representation of FIG. 1*c*, both transistors F2 and 15, in series, act as a two state variable capacitor. In this way, inductance of the signal line S can be fixed (or changed) by varying the capacitance. Also, by effectively changing the FET (transistor) capacitance from $C_2$ to ½ $C_2$, the transition frequency can be doubled allowing inductance to be changed between two states over a wide band.

Figure 2:
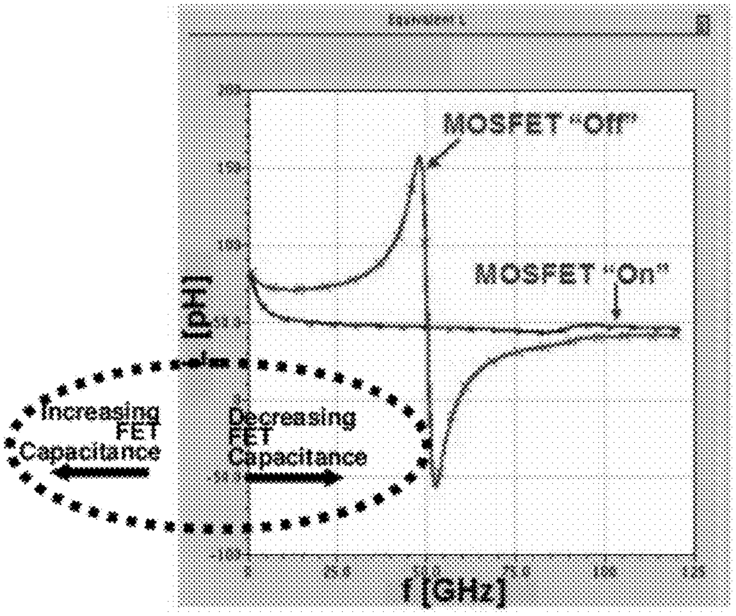
FIG. 2 shows the effect of series capacitance on an inductance return path in accordance with the circuit shown in FIG. 1*a;*

FIG. 2 shows the effect of series capacitance on an inductance return path in accordance with the circuit shown in FIG. 1*a*. More specifically, as shown on the FIG. 2, the transition frequency from a high inductance state to a low inductance state of the MOSFET "off" state decreases significantly with increasing FET size and capacitance. Similarly, the transition frequency from a high inductance state to a low inductance state of the MOSFET "off" state increases significantly with decreasing FET size and capacitance. Accordingly, by effectively changing the FET capacitance, e.g., from C to ½ C, the transition frequency can be doubled allowing inductance to be changed between two states over a wide band.

Figure 3:
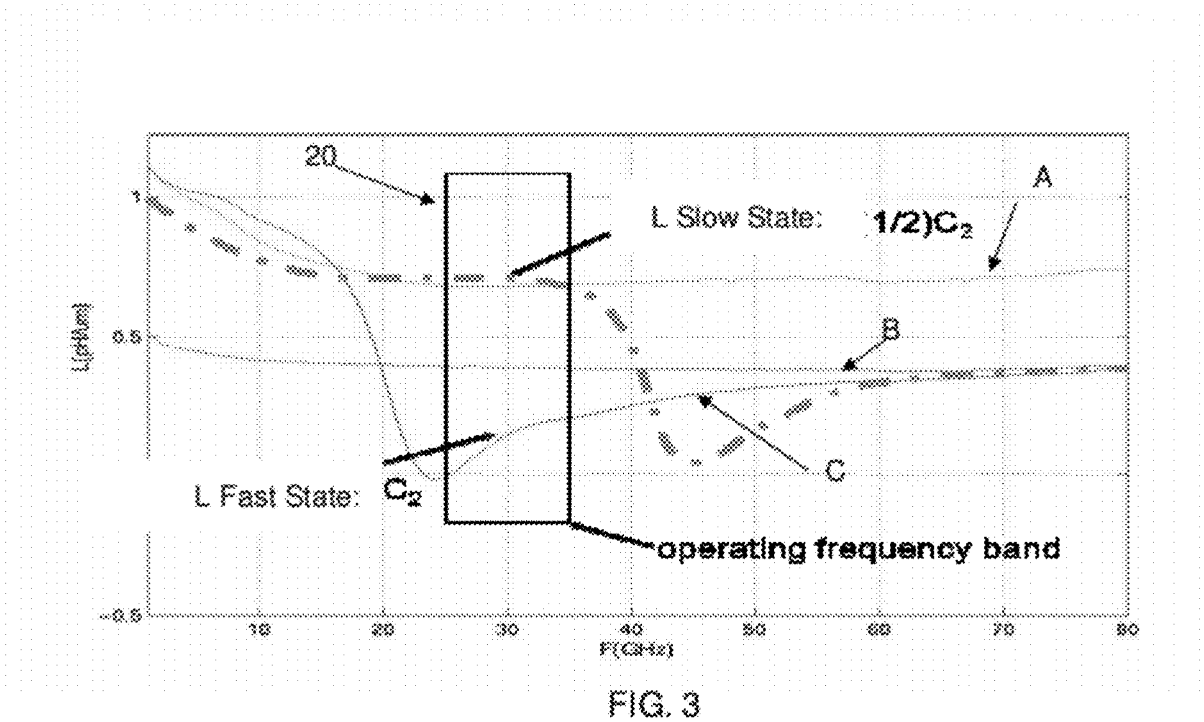
FIG. 3 shows a graph of inductance vs. frequency of a tunable t-line using a switch shown in the circuit of FIG. 1*a;*

FIG. 3 shows a graph of inductance vs. frequency for a switch shown in the structure of FIG. 1*a*. More specifically, FIG. 3 shows a simulation of a 45 nm SOI structure using capacitance to change inductance of the signal line of the circuit of FIG. 1*a*. In FIG. 3, line "A" represents open inductance return lines. Line "B" represents grounded inductance control lines. Line "C" represents inductance return lines with capacitance connected.

The shaded area represented by reference numeral 20 is an operating frequency band of the tunable structure 5 of the present invention. Although the operating frequency is shown at about 25 GHz to about 35 GHz, it should be understood by those of skill in the art that the present invention contemplated other operating frequencies, depending on the design criteria of the structure 5 (e.g., spacing of inductance and signal lines, as well as other parameters). For example, the operating frequency can be at about 60 GHz, as described below. In any scenario, the dashed line "D" in the operating frequency 20 shows a slow state (½ $C_2$) and the line "C" in the operating frequency shows the slow state ($C_2$). Accordingly, the circuit of the present invention will eliminate the need to reduce off state capacitance.

Figure 4:
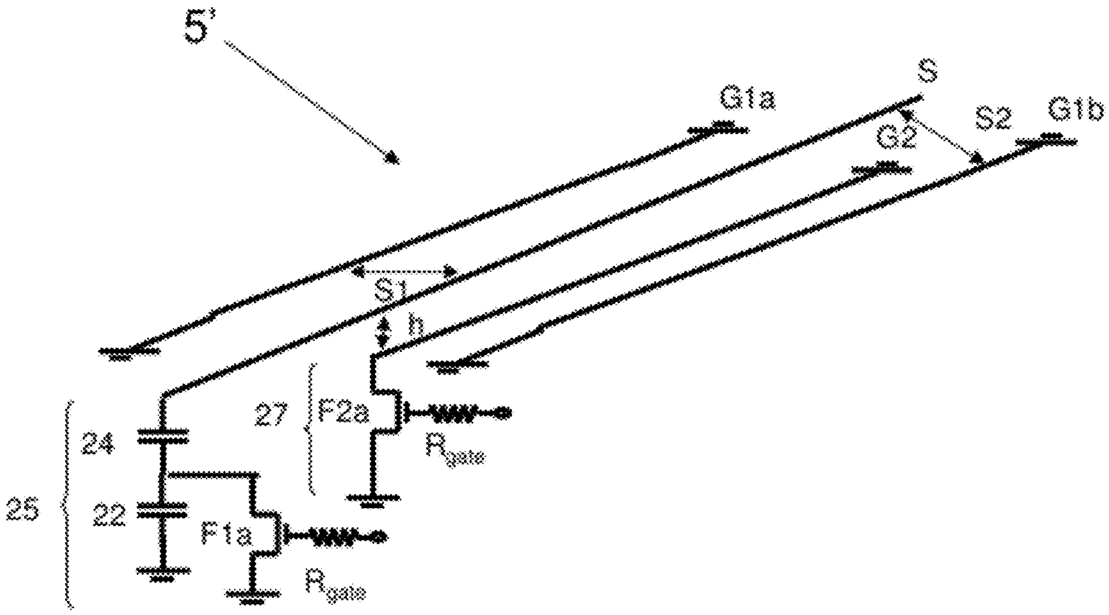
FIG. 4 shows an additional embodiment in accordance with aspects of the present invention.

FIG. 4 shows an additional embodiment in accordance with aspects of the present invention. More specifically, FIG. 4 shows a representative tunable t-line circuit with functionally differentiated switches, generally represented at reference numeral 5'. The structure 5' includes ground return lines G1*a* and G$\mathbf{1}_b$ and inductor control line G2. The ground return lines G1*a* and G$\mathbf{1}_b$ are both connected to ground Gnd. The structure 5' further includes a signal line S, e.g., capacitance control line. In embodiments, the ground control line G1*a* and adjacent signal line S have a spacing of S1, and the signal line and inductor control line G2 have a spacing "h". Moreover, the ground control line G$\mathbf{1}_b$ and signal line S have a spacing of S2. As should be understood by those of skill in the art, the spacings will affect inductance, which can be compensated by use of switches 25, 27 of structure 5' (discussed in more detail below).

Still referring to FIG. 4, the switch 25 includes transistor F$\mathbf{1}_a$ connected in parallel with a capacitor 22, and capacitor 22 connected to a capacitor 24, in series. The transistor F$\mathbf{1}_a$ and capacitors 22, 24 are connected to the signal line S. In this configuration, the transistor F$\mathbf{1}_a$ switches line capacitance by either acting as a resistor in the on state or a capacitor in the off state. For example, in the off state, the effective capacitance of the transistor becomes that of capacitor 22 and the transistor F$\mathbf{1}_a$ in parallel, and the capacitance of capacitor 24, in series. Accordingly, as in the previous embodiment, the configuration of the transistor F$\mathbf{1}_a$ can be used to change the characteristic impedance or maintain a constant characteristic impedance by compensating for a change in the inductance caused by a change in transistor $F2_a$.

The structure 5' also includes a switch 27 represented by a transistor $F2_a$ connected to a resistor Rgate and the inductor control line G2. In this configuration, thus, the transistor $F2_a$ switches the line inductance. In embodiments, the resistor Rgate is an RF isolation resistor, which can have a value of, for example, about 10Ω. In embodiments, a potential connected to the Rgate can turn the transistor $F2_a$ on or off to and Rgate blocks any RF leakage.

In operation, the transistor $F1_a$ switches the line capacitance through the signal line S. The transistor $F2_a$, on the other hand, switches the line inductance through the inductor control line G2. When the transistor $F1_a$ is on and the transistor $F2_a$ is off, the structure 5' is in the slow state. On the other hand, when the transistor $F1_a$ is off and the second switch $F2_a$ is on, the structure 5' is in the fast state. In this way, the circuit of the present invention acts like a variable capacitance and variable inductance, e.g., the circuit changes capacitance when the transistors $F1_a$, $F2_a$ are turned on and off.

Figure 5:
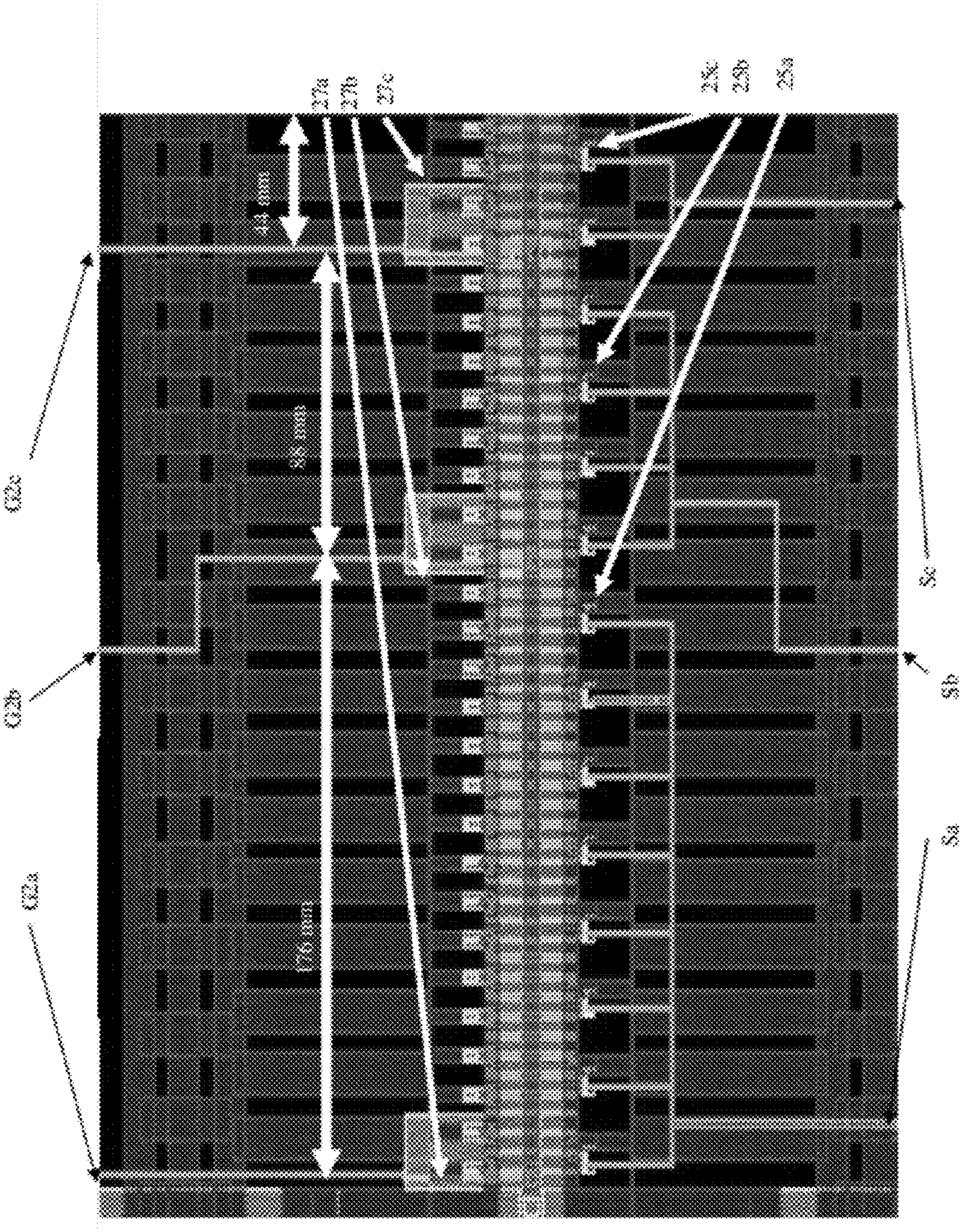
FIG. 5 shows a layout representative of the structure of FIG. 4.

FIG. 5 shows a schematic level layout representative of the structure 5' of FIG. 4. In this representation, three signal lines (capacitance control lines) Sa, Sb and Sc are connected to three groups of switches represented by reference numeral 25*a*, 25*b* and 25*c*. The switches 25*a-c*, e.g., include the transistors F1*a* and capacitors 22, 24 (or alternatively, transistor F1 and 10 of FIG. 1*a*). Additionally, three inductance control lines G2*a*, G2*b* and G2*c* are connected to three switches 27*a*, 27*b* and 27*c*. The switches 27*a-c*, e.g., include the transistors F2*a* and resistor Rgate (or alternatively, transistors F2 and 15 of FIG. 1*a*).

In this embodiment, the spacing between respective inductance lines G2*a* and G2*b* is 176 μm, the spacing between respective inductance lines G2*b* and G2*c* is 88 μm, and the spacing between inductance line G2*c* and an end of the circuit is 44 μm. The switch 27*a* that controls the inductance line G1*a* has a 32 μm wide FET. The switch 27*b* that controls the inductance line G2*b* has a 64 μm wide FET, and the switch 27*c* that controls the inductance line G2*c* has a 128 μm wide FET. Also, each of the FET 25*a-c* that control the respective signal line Sa-c is an 8 μm FET, with 8 FETs controlling the signal line Sa for the largest segment, e.g., 176 μm, 4 FETs controlling the signal line Sb for the medium segment, e.g., 88 μm, and 2 FETs controlling the signal line Sa for the smallest segment, e.g., 44 μm. It should also be understood by those of skill in the art that other dimensions are contemplated by the present invention, with the same ratios.

As can be ascertained from the configuration of FIG. 5, each distance between the inductance lines (and end of circuit) is ½ the length of the previous distance, and the respective FET that controls the inductance line is twice as large. In this configuration, inductance control FET size goes small to high from the largest segment to the smallest segment. Also, capacitance control FET size goes high to small from the largest segment to the smallest segment.

Figure 6:
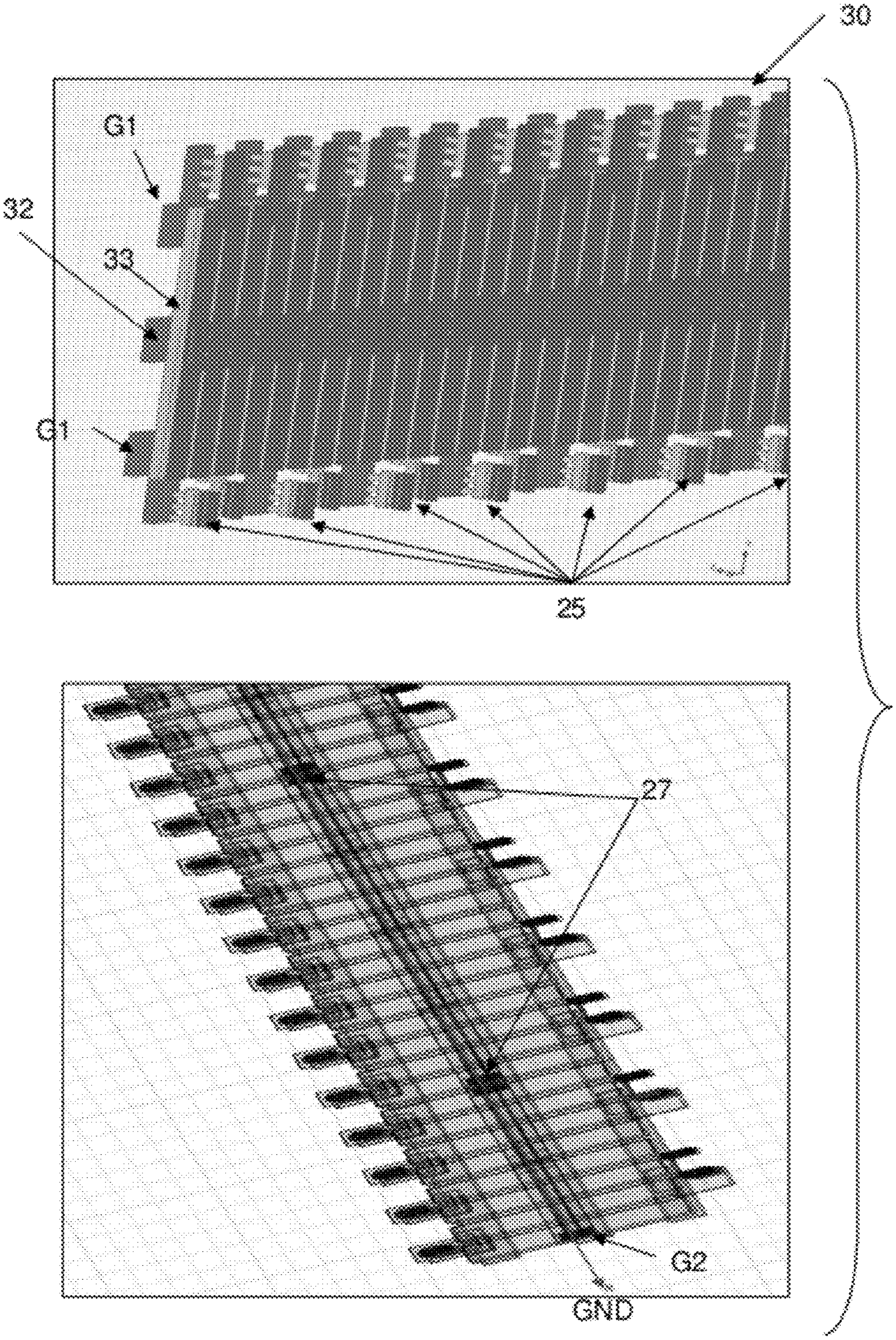
FIG. 6 shows a representative structure which implements aspects of the present invention.

FIG. 6 shows a representative structure, which implements aspects of the present invention. The structure 30 shown in FIG. 6 can be made using conventional CMOS techniques such as, for example, lithography, etching and deposition processes in order to form the switches 25 and 27 of FIG. 4 or the variable capacitor of FIG. 1*a*.

More specifically, the structure 30 shows ground return lines G1 on opposing sides of a signal line 32. The structure 30 additionally includes a plurality of capacitance control lines S and inductor control line(s) G2. As should be understood by those of skill in the art, as the proximity (location) of the return current is changed in the representative structure 30, the inductance of the structure 30 will also change. Due the possible changes in the inductance, the representative switch 25 of FIG. 4 or variable capacitor of FIG. 1*a* can be used to fix the inductance of the structure 30 of FIG. 6.

FIG. 6 also shows the locations of the switches 25 and 27 of FIG. 4, for example, or the variable capacitor of FIG. 1*a*. In FIG. 6, switches 25 are connected to the capacitance crossing lines 33. As discussed in more detail below, the capacitance crossing lines 33 do not affect inductance as they run perpendicular to the signal line 32. The inductance control lines G2 are controllably connected to respective switches 27 and ground. In the unconnected state, the inductance control line segments connected to switches 27 do not affect the inductance of the signal line 32.

As is known such that further explanation is not believed necessary, the characteristic impedance of a transmission line structure may be approximated as the square root of the ratio of the inductance ("L") to the capacitance ("C"), e.g., SQRT (L/C). Moreover, the delay of a transmission line structure may be approximated as the square root of the product of the inductance and the capacitance, e.g., SQRT(L*C). Additionally, the capacitance of a transmission line structure generally decreases with the distance between the signal line and the ground return line, while the inductance of the transmission line structure generally increases with the distance between the signal line and the ground return line.

As such, if the ground return line G1 is moved closer to the signal line S, the capacitance of the transmission line structure will increase and the inductance of the transmission line structure will decrease. Alternatively, as the ground return line G1 is moved further away from the signal line S, the capacitance of the transmission line structure decreases while the inductance of the transmission line structure increases. Owing to this opposite relationship of capacitance and inductance with respect to the distance between the signal line and ground return line, it is not possible to use conventional structures to vary the transmission line structure delay without also varying the characteristic transmission structure when switching capacitance and inductance separately. However, in accordance with aspects of the invention, the circuit shown in FIGS. 1*a* or 4 it is possible to selectively change the capacitance of the transmission line structure without significantly altering the inductance of the transmission line structure; that is, the mmW tunable t-line design of the present invention can thus provide a fixed characteristic impedance.

Figure 7:
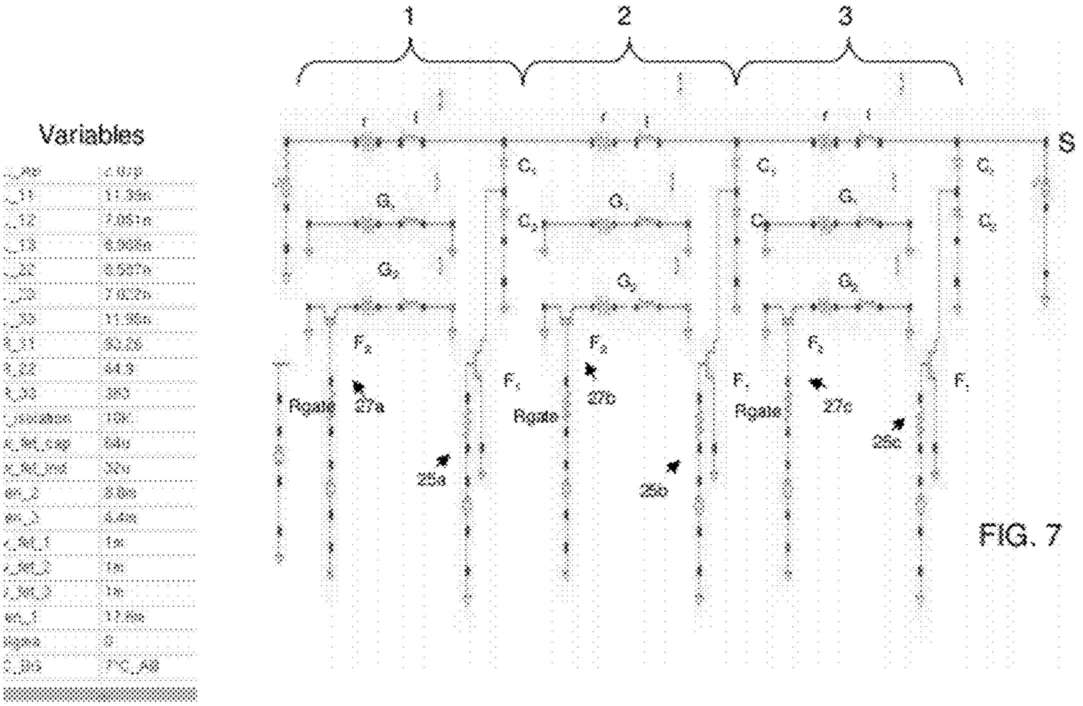
FIG. 7 shows a schematic level circuit of FIG. 4, implemented in the representation of FIG. 5.

FIG. 7 shows a schematic level tunable t-line of FIG. 4, implemented in the representation of FIG. 5. FIG. 7 also shows several non-limiting illustrative variables used in the schematic level tunable t-line. For example, each of the FETs F1, F2 have an initial control voltage of 1 m, with segment lengths of 176 μm (len_1: $17.6\times10^{-3}$ cm), 88 μm (len_2: $8.8\times10^{-3}$ cm) and 44 μm (len_3: $4.4\times10^{-3}$ cm). The inductance control FET is 32 μm wide and the capacitance control FET is 64 μm wide, with the isolation resistance (Rgate) of 10 kΩ (10K). The capacitance from the signal line S to the capacitance crossing lines (32) is C_AB 2.07 picofarad/mc, and the capacitance from the capacitance cross lines to the system ground is C_BG 7*_AB.

In FIG. 7, three segments 1, 2 and 3 are provided with a common signal line S. The signal line S includes one resistor "r" and one inductor "l" for each segment, 1, 2 and 3. Segment 1 represents the spacing between respective inductance lines G1*a* and G2*b* (e.g., 176 μm), segment 2 represents the spacing between respective inductance lines G2*b* and G2*c* (e.g., 88 μm) and segment 3 represents the spacing between inductance line G2*c* and an end of the circuit (e.g., 44 μm). FIG. 7 further shows the inductance lines G2*a-c* with respective switches 27*a-c* (e.g., transistor F2 and resistor, Rgate) for each of the segments 1, 2 and 3, and signal line S connected to respective switches 25*a-c* (e.g., transistor F1 and capacitors 22, 24).

In this representation, F1 for switch 25*a* is 64 μm wide, F1 for switch 25*b* is 32 μm wide, and F1 for switch 25*c* is 16 μm wide. On the other hand, F2 for switch 27*a* is 32 μm wide, F2 for switch 27*b* is 64 μm wide, and F2 for switch 27*c* is 128 μm wide. Accordingly, as the resistance is decreased (e.g., smaller segments), the transistors F1 decrease in size (by one half) and the transistors F2 increase in size (by 2×) for each segment that decreases in length by one half (½×). In this way, it is possible to have a smaller FET with a large resistance in the off state of F1. It should be understood by those of skill in the art that other dimensions can also be used with the present invention, within the teachings provided herein.

Figure 8:
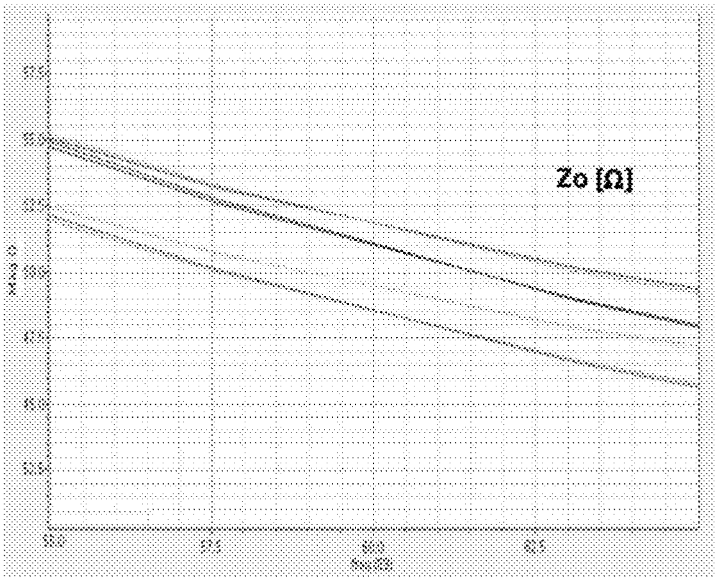
FIG. 8 shows a graph of frequency vs. characteristic impedance magnitude as implemented with the circuits) of the present invention.

FIG. 8 shows a graph of frequency vs. magnitude of characteristic impedance as implemented with the circuits of the present invention. More specifically, FIG. 8 shows simulation results of the structure shown in FIG. 7 using a 3 bit line (mode). FIG. 8 shows that the characteristic impedance of the line (Zo) remains fairly constant over 8 states (32 bits), e.g., about a 6.7% variation with a +/−3.7% variation from the 50 Ohm target at 60 GHz. That is, the graph shows that the characteristic impedance of the structure remains constant over different delay states, with implementations of the circuits of the present invention.

Figure 9:
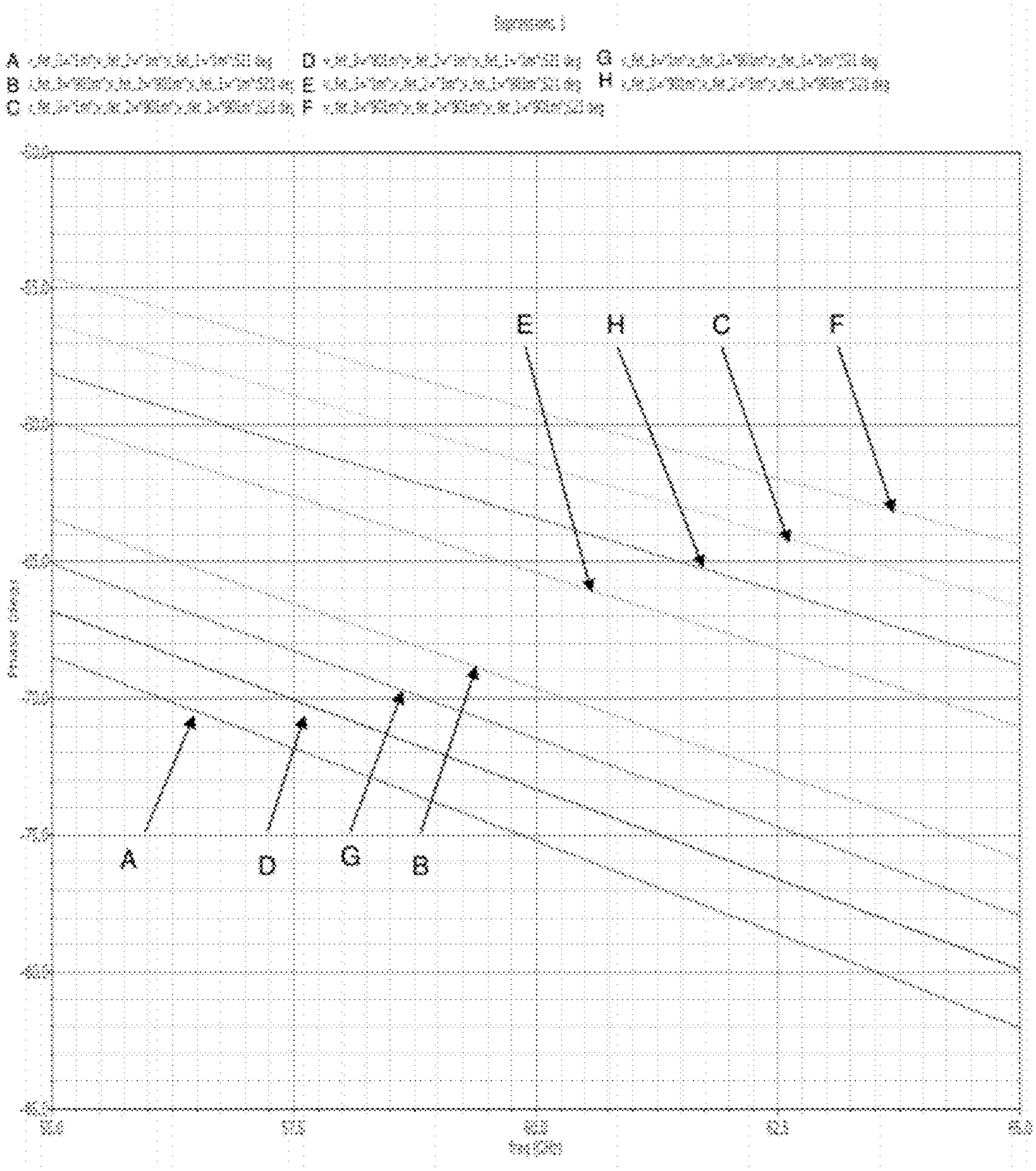
FIG. 9 shows a graph of frequency vs. phase (in a 3 bit mode) as implemented with the circuit(s) of the present invention.

FIG. 9 shows a graph of frequency vs. phase as implemented with the circuits of the present invention. More specifically, FIG. 9 shows the delay in the signal line using a 3 bit line (mode). In FIG. 9, lines A-H represent different values for F1 and F2, and respective phases. In this representation, the circuit represented by line A is in the slow phase, e.g., F1 on and F2 off, and the line represented by line F is in a fast phase, e.g., F1 off and F2 on. As shown, there is about a 27% variation at a range of about 60 GHz, with implementations of the circuits of the present invention.

Figure 10:
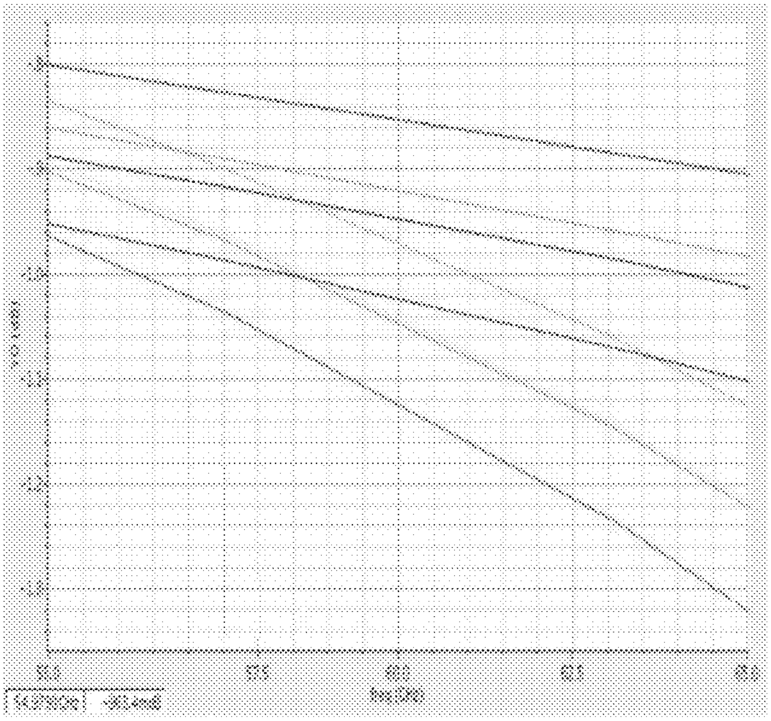
FIG. 10 shows a log graph of frequency vs. insertion loss in decibels (in a 3 bit mode) as implemented with the circuit(s) of the present invention.

FIG. 10 shows a log graph of frequency vs. insertion loss in decibels as implemented with the circuits of the present invention. More specifically, FIG. 10 shows the loss in the signal line using a 3 bit line (mode). As show in FIG. 10, there is 1.3 db maximum loss and a 0.4 db variation at 60 GHz, with implementations of the circuits of the present invention.

Figure 11:
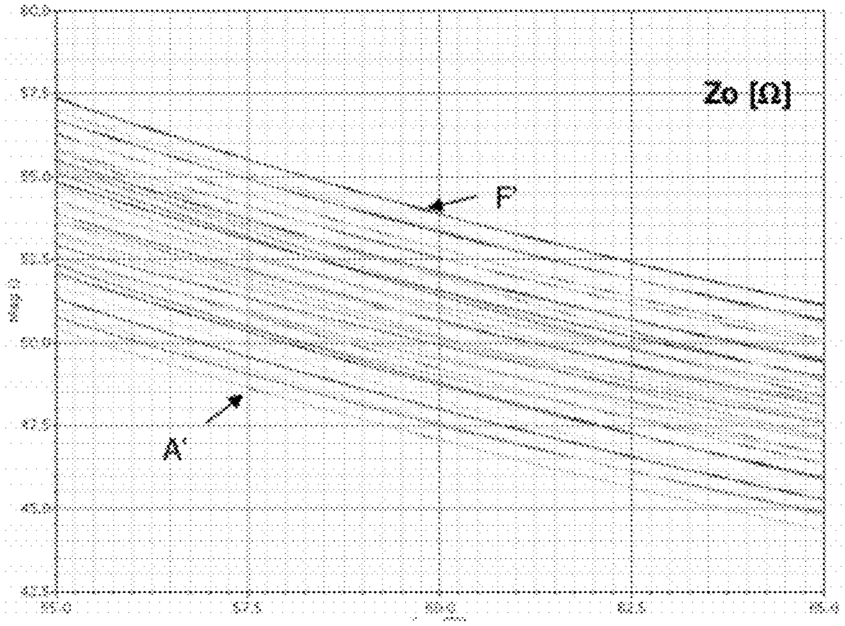
FIG. 11 shows a graph of frequency vs. characteristic impedance magnitude (in a 6 bit mode) as implemented with the circuit(s) of the present invention.

FIG. 11 shows a graph of frequency vs. magnitude as implemented with the circuits of the present invention. More specifically, FIG. 11 shows simulation results of the structure shown in FIG. 7 using a 6 bit line (mode). FIG. 11 shows that the characteristic impedance of the line (Zo) and the line delay remains fairly constant over 64 states e.g., about a 14.4% variation with a +/−7.4% variation from the 50 Ohm target (e.g., double from that shown in the 3 bit mode at 60 GHz). That is, the graph shows that the characteristic impedance of the structure remains constant over different delay states, with implementations of the circuits of the present invention.

Figure 12:
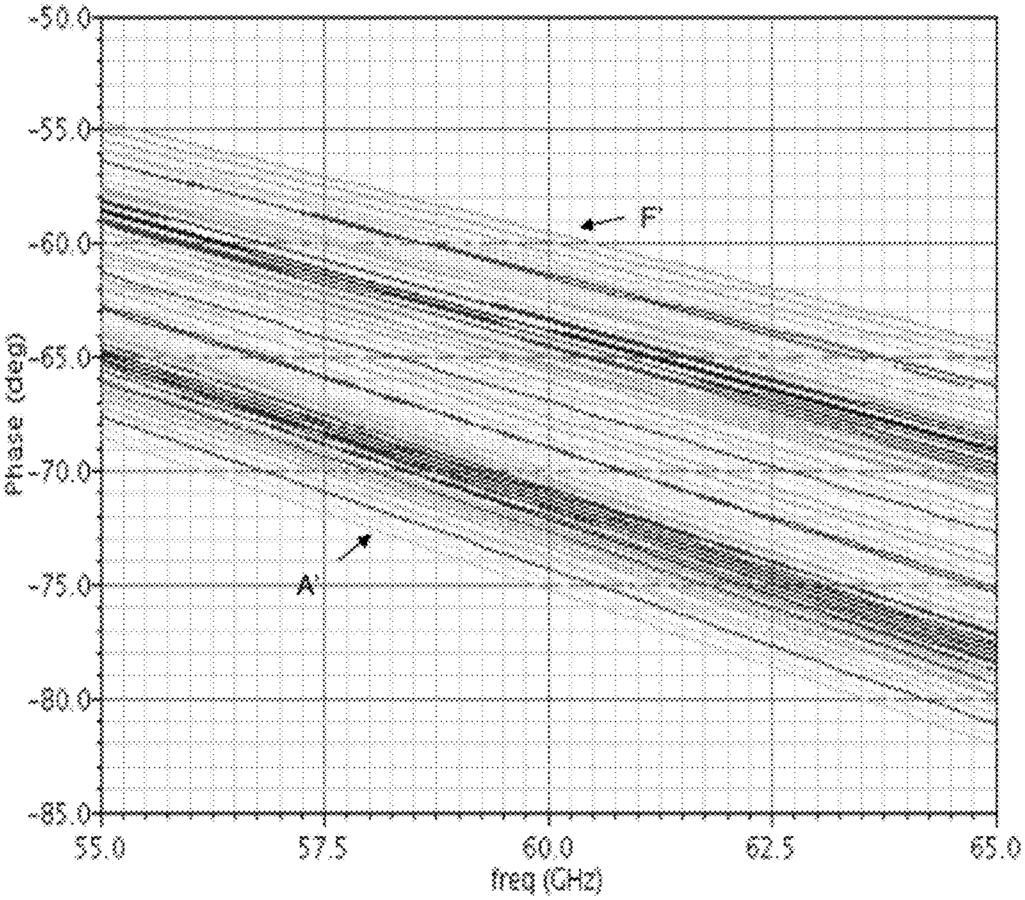
FIG. 12 shows a graph of frequency vs. phase (in a 6 bit mode) as implemented with the circuit(s) of the present invention.

FIG. 12 shows a graph of frequency vs. phase as implemented with the circuits of the present invention. More specifically, FIG. 12 shows the delay in the signal line using a 6 bit line (mode). In FIG. 12, the representative lines represent different values for F1 and F2, and respective phases. In this representation, the circuit represented by line A' is in the slow phase, e.g., F1 on and F2 off, and the line represented by line F' is in a fast phase, e.g., F1 off and F2 on. As shown, there is about a 26.7% variation at the 60 GHz range, with implementations of the circuits of the present invention.

Figure 13:
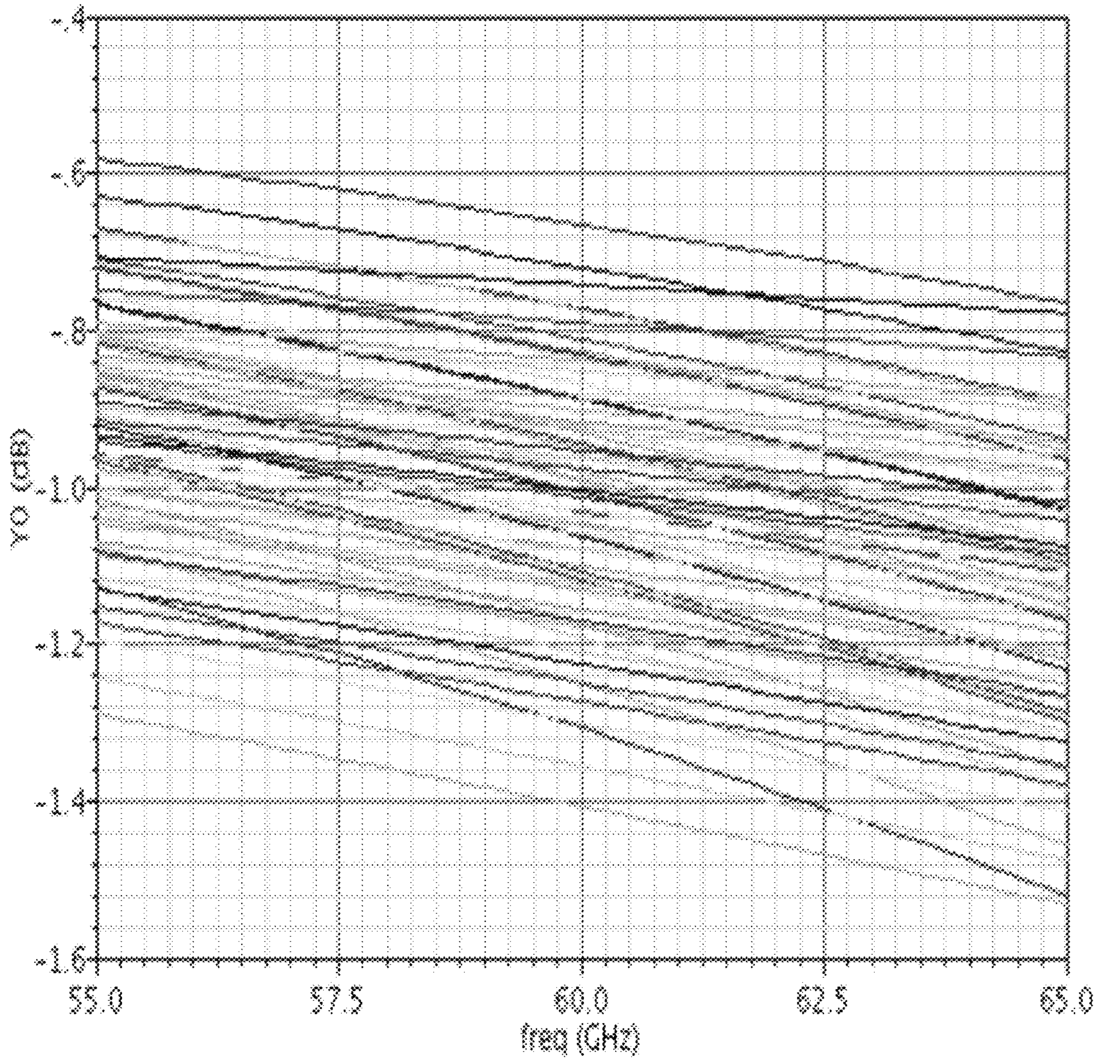
FIG. 13 shows a graph of frequency vs. insertion loss in decibels (in a 6 bit mode) as implemented with the circuit(s) of the present invention.

FIG. 13 shows a graph of frequency vs. insertion loss in decibels as implemented with the circuits of the present invention. More specifically, FIG. 13 shows the loss in the signal line using a 6 bit line (mode). As show in FIG. 13, there is about a 1.53 db maximum loss at 65 GHz, with implementations of the circuits of the present invention, and a 0.75 db variation at 60 GHz.

Figure 14:
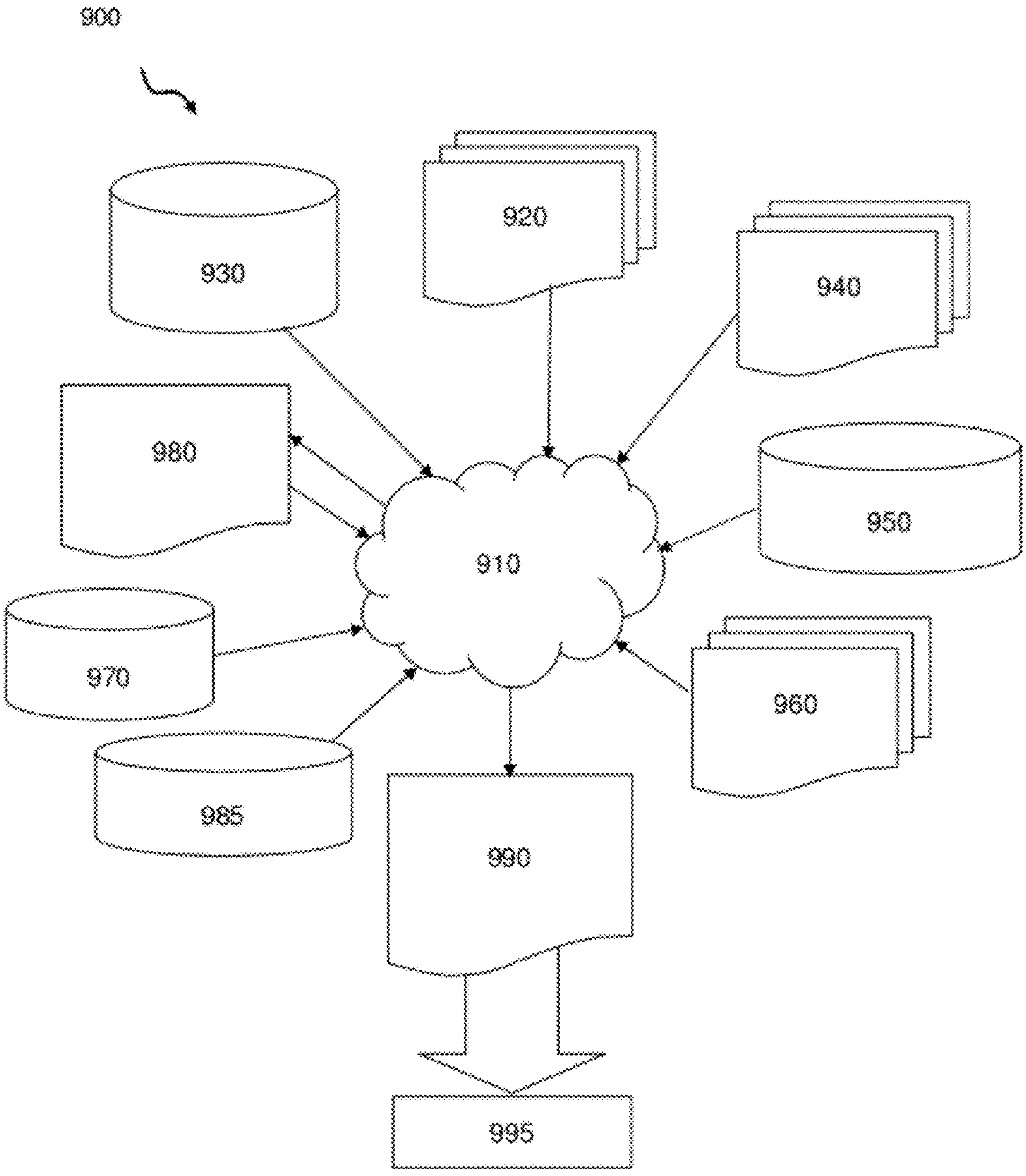
FIG. 14 is a flow diagram of a design process used in semiconductor design, manufacture, and/or test.

FIG. 14 is a flow diagram of a design process used in semiconductor design, manufacture, and/or test. FIG. 14 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 1*a-c* and 4. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 14 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1*a-c* and 4. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1*a-c* and 4 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1*a-c* and 4. In one embodiment, design structure 990 may comprise a compiled, executable HDL simulation model that functionally simulates the devices shown in FIGS. 1*a-c* and 4.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1*a-c* and 4. Design structure 990 may then proceed to a stage 995 where, for example, design structure 990: proceeds to tape-out, is released to manufacturing, is released to a mask house, is sent to another design house, is sent back to the customer, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A structure comprising a tunable transmission line (t-line) with fixed characteristic impedance comprising functionally-differentiated switches used for inductance and capacitance, respectively, wherein:

the functionally-differentiated switches comprise:

a first switch comprising at least a capacitor; and a second switch comprising at least a transistor; and the first switch and the second switch separately control inductance and capacitance to maintain a fixed impedance.

2. The structure of claim 1, wherein the first switch comprises a transistor in series with the capacitor and the second switch comprises two transistors, in series, connected to inductance lines.

3. The structure of claim 2, wherein:

in an on state, the second switch effectively becomes a resistor in series with a capacitor; and in an off state, the second switch effectively becomes capacitors, in series.

4. The structure of claim 2, wherein the transistor of the first switch is structured to switch a line capacitance through a signal line S and the transistor of the second switch is structured to switch the line inductance through inductor control lines.

5. The structure of claim 2, wherein:

the transistor of the first switch is on and the transistor of the second switch is off, a circuit is in a slow state; and the transistor of the first switch is off and the transistor of the second switch is on, a circuit is in a fast state.

6. The structure of claim 1, wherein:

the first switch comprises a transistor F1 and the capacitor in an on state and off state;

in the on state, the transistor F1 effectively becomes a resistor $R_1$ in series with a capacitor C; and in the off state, the transistor F1 becomes a capacitor $C_1$ in series with the capacitor C.

7. The structure of claim 6, wherein:

the capacitor C, in either the on state or the off state, is representative of an additional signal line capacitance in a slow state; and $(C_1C)/(C_1+C)$ is representative of an additional signal line capacitance of a fast state.

8. The structure of claim 1, wherein the first switch comprises transistor $F1_a$ connected in parallel with the capacitor, and a second capacitor connected to the capacitor, in series.

9. The structure of claim 8, wherein the transistor $F1_a$ and the capacitor and the second capacitor are connected to a signal line S such that the transistor $F1_a$ switches line capacitance by either acting as a resistor in an on state or a capacitor in an off state.

10. The structure of claim 9, wherein the second switch comprise the transistor $F2_a$ connected to a resistor Rgate and an inductor control line G2 such that the transistor $F2_a$ switches the line inductance.

11. A structure comprising a tunable transmission line (t-line) with fixed characteristic impedance comprising functionally-differentiated switches used for inductance and capacitance, respectively, wherein:

the functionally-differentiated switches comprise:

a first switch comprising at least a capacitor; and a second switch comprising at least a transistor; and the functionally-differentiated switches act like a variable capacitance when a transistor F1 and the transistor F2 of the functionally-differentiated switches are turned on and off.

12. A structure comprising a tunable transmission line (t-line) with fixed characteristic impedance comprising functionally-differentiated switches used for inductance and capacitance, respectively, wherein:

the functionally-differentiated switches include segments, each comprising transistors connected to inductance lines and a signal line;

a distance between inductance lines of each segment is ½ a length of a previous segment;

respective field effect transistors (FETs) that control the inductance lines are twice as large as the previous segment; and respective FETs connected to the signal line or capacitance cross lines are half as large as the previous segment.

13. A method of manufacturing a transmission line structure, comprising forming a tunable transmission line (t-line) upon a substrate with fixed characteristic impedance comprising functionally-differentiated switches used for inductance and capacitance, wherein the forming the functionally-differentiated switches comprises:

forming a first switch connected to a signal line comprising a transistor and at least one capacitor connected in series; and forming a second switch connected to inductance lines comprising at least two transistors connected in series.

14. A method of manufacturing a transmission line structure, comprising forming a tunable transmission line (t-line) upon a substrate with fixed characteristic impedance comprising functionally-differentiated switches used for inductance and capacitance, wherein the forming the functionally-differentiated switches comprise:

forming a first switch connected to a signal line comprising two capacitors connected in series and a transistor connected in parallel to the capacitor; and forming a second switch connected to an inductance line comprising transistors and a resistor connected in series.

15. A method in a computer-aided design system for generating a functional design model of a tunable transmission line (t-line), said method comprising:

generating, by at least one computing device, a functional design model of the tunable transmission line with fixed characteristic impedance further comprising functionally-differentiated switches used for inductance and capacitance, respectively, wherein:

the functionally-differentiated switches comprise:

a first switch comprising at least a capacitor; and a second switch comprising at least a transistor; and the first switch and the second switch separately control inductance and capacitance to maintain a fixed impedance.

16. The method of claim 15, wherein the functional design model comprises a netlist.

17. The method of claim 15, wherein the functional design model is encoded on storage medium as a data format used for the exchange of layout data of integrated circuits.

18. The method of claim 15, wherein the functional design model is encoded in a programmable gate array.

* * * * *